US008400347B2

(12) United States Patent
Fabre et al.

(10) Patent No.: US 8,400,347 B2
(45) Date of Patent: Mar. 19, 2013

(54) DEVICE AND METHOD FOR MONITORING THE LOCATION OF AIRCRAFT ON THE GROUND

(75) Inventors: Bernard Fabre, Fonsorbes (FR); Nicolas Marty, Saint Sauveur (FR); Hugues Meunier, Frouzins (FR)

(73) Assignee: Thales, Neuilly sur Seine (FR)

( * ) Notice: Subject to any disclaimer, the term of this patent is extended or adjusted under 35 U.S.C. 154(b) by 623 days.

(21) Appl. No.: 12/542,535

(22) Filed: Aug. 17, 2009

(65) Prior Publication Data

US 2010/0052973 A1 Mar. 4, 2010

(51) Int. Cl.
*G01S 13/93* (2006.01)
*G01S 13/91* (2006.01)
*G01S 13/00* (2006.01)

(52) U.S. Cl. .................. 342/36; 701/1; 701/3; 701/120; 701/300; 701/301; 342/37; 342/38; 342/42; 342/175; 342/195

(58) Field of Classification Search .............. 342/29–51, 342/52, 58, 60, 175, 195, 73, 89, 94–96; 701/1–3, 14–18, 120–122, 200, 207, 213, 701/300, 301, 206
See application file for complete search history.

(56) References Cited

U.S. PATENT DOCUMENTS

| | | | | |
|---|---|---|---|---|
| 5,406,289 | A * | 4/1995 | Barker et al. | 342/96 |
| 5,519,618 | A * | 5/1996 | Kastner et al. | 701/120 |
| 5,537,119 | A * | 7/1996 | Poore, Jr. | 342/96 |
| 5,608,392 | A * | 3/1997 | Faivre et al. | 701/206 |
| 5,959,574 | A * | 9/1999 | Poore, Jr. | 342/96 |
| 6,195,609 | B1 * | 2/2001 | Pilley et al. | 701/120 |
| 6,317,663 | B1 * | 11/2001 | Meunier et al. | 701/16 |
| 6,404,380 | B2 * | 6/2002 | Poore, Jr. | 342/96 |
| 6,980,892 | B1 * | 12/2005 | Chen et al. | 701/16 |
| 7,437,225 | B1 * | 10/2008 | Rathinam | 701/14 |
| 7,479,925 | B2 * | 1/2009 | Schell | 701/301 |
| 7,554,483 | B2 * | 6/2009 | Markiton et al. | 342/33 |
| 7,668,628 | B1 * | 2/2010 | Carrico | 342/29 |
| 7,739,047 | B2 * | 6/2010 | Meunier et al. | 701/300 |
| 7,765,037 | B2 * | 7/2010 | Bagge et al. | 701/16 |
| 8,035,547 | B1 * | 10/2011 | Flanigan et al. | 342/36 |
| 2006/0214816 | A1 * | 9/2006 | Schell | 701/301 |
| 2007/0043483 | A1 * | 2/2007 | Bagge et al. | 701/16 |
| 2007/0078592 | A1 * | 4/2007 | Meunier et al. | 701/120 |
| 2008/0195301 | A1 * | 8/2008 | Fabre et al. | 701/120 |

FOREIGN PATENT DOCUMENTS

| | | | |
|---|---|---|---|
| FR | 2 891 645 | A | 4/2007 |
| FR | 2891645 | A1 * | 4/2007 |
| WO | WO 2006/135923 | A | 12/2006 |

* cited by examiner

*Primary Examiner* — Bernarr Gregory
(74) *Attorney, Agent, or Firm* — LaRiviere, Grubman & Payne, LLP

(57) ABSTRACT

The invention relates to a monitoring device and method allowing surveillance of an aircraft in relation to aircraft and/or craft on an airport displacement zone. The invention is a system comprising a dedicated transmitter and receiver to receive the information regarding the location and displacement of the cooperative aircraft and to monitor the location of the said aircraft in relation to the cooperative aircraft. The monitoring application is based on the detection of conflict zones by inter-correlation of constraint surfaces of the airport zone. The invention applies to aircraft carrying communication moans for ADS-B networks for an airport zone monitoring application.

9 Claims, 7 Drawing Sheets

DEVICE AND METHOD FOR MONITORING THE LOCATION OF AIRCRAFT ON THE GROUND

PRIORITY CLAIM

This application claims priority to French Patent Application Number 08 04763, entitled Device and Method for Monitoring the Location of Aircraft on the Ground, filed on Aug. 29, 2008.

FIELD OF THE INVENTION

The present invention relates to assisting the person in charge of an aircraft in respect of compliance with rolling constraints and the avoidance of collisions between aircraft on the ground. It relates more particularly to the detection, evaluation and signalling to the person in charge of an airport craft of any abnormal situation of the craft in the highly regulated environment of an airport.

Since the significant reduction in air accidents due to a ground collision of an aircraft that is still maneuvering, accidents of so-called CFIT type (the acronym standing for the expression: "Controlled Flight Into Terrain"), obtained with TAWS ground collision prevention systems (the acronym standing for the expression: "Terrain Awareness and Warning System), the main cause of air accidents has now become on-airport ground collisions between aeroplanes or other craft.

The main reason for these ground traffic accidents in airports, commonly known by the terms "Runway Incursion" or "Runway Intrusion", is the unauthorized penetration of a craft onto a trafficway (runway, taxiway, parking bay, etc.). Such unauthorized penetrations which inevitably give rise to risks of collision with any aeroplanes rolling or in the process of taking off or landing are, in essence, the consequence of a failure to comply (in large part through inattentiveness) with the rolling authorizations provided by the air traffic control or airport traffic authorities.

Ground traffic accidents are also due to collisions between aircraft travelling around the airport space. The increase in air traffic has increased the number of aeroplanes in flight and therefore also the number of aeroplanes on the ground travelling around the taxiways. To respond to growing passenger demand, the frequency of takeoffs and landing has risen, promoting the risk of collisions. For example, the queues of waiting aeroplanes standing by for takeoff have lengthened and densified and require a smaller distance between each aircraft. The logistics of routing aircraft on the ground is thus more difficult for pilots to manage.

According to the rules currently in force, the rolling of a craft on an airport is performed on request and by the person in charge of the craft, but according to the authorizations provided by the air traffic control or airport traffic authorities, responsible for ensuring the organized and safe flow of ground movements. The person in charge of the craft performs the rolling of his craft freely within the framework of the authorizations obtained.

Hitherto, compliance with the various constraints associated with rolling on the surface of an airport and their compatibility with the authorizations granted is performed visually by the person in charge of the craft.

BACKGROUND OF THE INVENTION

The literature mentions various experiments conducted with a view to formulating onboard equipment facilitating the piloting of an aircraft while rolling on the surface of an airport especially in the case of poor visibility. The article by Sharon Otero Beskenis et al, entitled "Integrated Display System For Low Visibility Landing and Surface Operations" published in July 1998 under the reference NASA/CR-1998-208446 describes an experiment with an aeroplane of the Boeing B-757 type equipped with a head-level screen HDD (the acronym standing for the expression: "Head-down display") displaying a pop-up map of the airport pinpointing the aircraft on the trafficways of the airport by utilizing a geographical location delivered by a satellite differential positioning system and an electronic map of the airport, depicting the rolling path assigned to the aircraft by the airport traffic authorities, the reporting points delimiting the rolling authorizations as well as reporting points transmitted by a runway anti-intrusion ground-based system dubbed AMASS (the acronym standing for the expression: "Airport Movement Area Safety System").

These conclusive experiments have not had any immediate follow-up because of the high level of equipment required for the airport ground installations. Simpler systems offering a less complete service but not demanding any particular equipment for the airport have since been proposed.

U.S. Pat. No. 6,606,563 describes an alert system plotting, by GPS positioning, the position of an aircraft on the surface of an airport modelled in an electronic memory and signalling to the pilot that he is approaching or penetrating onto a runway.

French patent application FR2891645 describes a method and device for evaluating the significance of a risk of violation of a traffic flow constraint for a craft provided with geographical location equipment and deploying on the surface of an airport comprising zones with traffic flow constraint. The evaluation of the intrusion significance risk is based on the inter-correlation of a first zone related to a craft and of a second zone related to congestion or constraint zones of an airport, these zones corresponding to constructions such as air terminals, hangars and also routing zones for which the aircraft has not received access authorization.

Neither of these two systems makes it possible to take into account the risks of collisions in relation to craft in the close environment of an aircraft. It is easier to monitor congestion zones, of the construction, taxiway, air terminal type, on an airport surface since these zones do not change or do so very rarely, and are known by means of databases updated regularly by the control authorities.

SUMMARY OF THE INVENTION

The aim of the present invention is to signal to the person in charge of an aircraft travelling around the surface of an airport an incompatibility in the situation of his aircraft in relation to mobile elements in the close neighbourhood thereof so as to improve the safety of displacement of aircraft on airport zones.

More precisely, the invention is a device for monitoring location of an aircraft in relation to cooperative craft, the said aircraft being provided with a geographical location system, characterized in that the aircraft is cooperative with a data communication network and in that the monitoring device comprises:

- an onboard means for broadcasting data in an automatic manner to non-designated recipients cooperative with the communication network,
- an onboard means for receiving the data transmitted by transmitters cooperative with the communication network, the data comprising at least indications of location and displacement of cooperative aircraft, a cost surface database storing:

a first conflict cost surface encompassing the deployment surface, related to cooperative aircraft and defined by the ratings assigned to its points, representative of their memberships in a congestion zone covering the vicinity of the current positions of each cooperative aircraft, of the uncertainties in positioning of the aircraft and of the safety margins to be complied with in relation to the aircraft and a second conflict cost surface encompassing the deployment surface, related to the aircraft on board which the monitoring device is carried and defined by the ratings assigned to its points, representative of their memberships in a congestion zone covering the vicinity of the current position of the aircraft, of the uncertainties in positioning of the aircraft and of the safety margins to be complied with in relation to the aircraft, and calculation means computing a score for evaluating the significance of a risk of violation of a traffic flow constraint incurred by the aircraft on the basis of an inter-correlation function of the two dangerousness cost surfaces referred to one and the same benchmark.

Advantageously, the broadcasting means and reception means communicate with a communication network of ADS-B type ("Automatic Dependent Surveillance—Broadcast") and of TIS-B type ("Traffic Information Service Broadcast").

Advantageously, the broadcast data comprise at least indications of location and of displacement of the craft.

Advantageously, the monitoring method comprises the following steps:

Modelling of a first conflict cost surface encompassing the deployment surface, related to the cooperative aircraft and defined by the ratings assigned to its points, representative of their memberships in a congestion zone covering the vicinity of the current positions of each aircraft, of the uncertainties in positioning of the aircraft and of the safety margins to be complied with in relation to the aircraft, Modelling of a second conflict cost surface encompassing the deployment surface, related to the aircraft and defined by the ratings assigned to its points, representative of their memberships in a congestion zone covering the vicinity of the current position of the aircraft, of the uncertainties in positioning of the aircraft and of the safety margins to be complied with in relation to the aircraft, Calculation of a score for evaluating the significance of a risk of violation of a traffic flow constraint incurred by the aircraft on the basis of an inter-correlation function of the two dangerousness cost surfaces referred to one and the same benchmark.

Advantageously, the ratings of the points of the first and of the second conflict cost surface related to cooperative craft also take account of the uncertainty in displacement heading of these craft.

Advantageously, the ratings of the points of the first and of the second conflict cost surface related to cooperative craft also take account of the speed of these craft.

Advantageously, the conflict cost surfaces related to craft are extended in a gradual manner and in the form of concentric surfaces forward of these craft in the direction of their movement.

Advantageously, the conflict cost surfaces related to craft exhibit in the vicinity of the aircraft, a relief of oblong form with transverse cuts of Gaussian forms extending forwards of these craft, in the direction of their movement.

These communication means allow the monitoring device to receive information identifying the aircraft and/or other craft in its vicinity and providing their location and displacement on the airport zone. They also allow an aircraft to transmit its own information. This information is broadcast and received automatically.

The device affords the crew of an aircraft a means of viewing the position of their craft in relation to other craft moving in their movement zone. The device is capable of transmitting alerts of audible, visual, textual and/or graphical type allowing the crew to anticipate critical situations.

BRIEF DESCRIPTION OF THE DRAWINGS

The invention will be better understood and other advantages will become apparent on reading the nonlimiting description which follows and by virtue of the appended figures among which.

DETAILED DESCRIPTION OF PREFERRED EMBODIMENT

The invention is intended particularly for assisting pilots in routing the machine around the airport surface so as to avoid collisions with other aeroplanes on the ground. Unlike the constraints related to the airport surface and the constructional elements, the aeroplanes present on the surface of the airport, in the neighbourhood of a pilot's machine, are not catalogued in a database regularly updated by the control authorities.

Here the expression traffic flow constraint is understood to mean the zones of traffic flow related to a craft in its neighbourhood. This zone represents the locations in the vicinity of craft that could cause a collision with the associated craft.

The evaluation of a risk of violation of a traffic flow constraint by a craft deploying within a surface comprising zones with traffic flow constraint is based on an inter-correlation function of two costs: an intrinsic cost and an extrinsic cost of conflict assigned to the points of the deployment surface. The intrinsic cost of conflict is a component of the risk of violation of a traffic flow constraint due solely to the location of the point with respect to craft travelling around the deployment surface. The extrinsic cost of conflict is a component of the risk of violation of a traffic flow constraint due solely to the location of the point with respect to the craft.

An essential characteristic of the invention is the use of ADS-B communication networks to obtain the location and displacements data for craft in the close environment of the aircraft so as to establish the conflict cost surface related to the various other aircraft.

The principle of ADS-B is to automatically transmit various parameters, such as the identification of the aeroplane, its position, its course, its speed, the ADS-B system of a machine being capable of recovering this information through the other sensors of the aeroplane. These messages are broadcast by way of a data link to non-designated recipients which may be other aircraft, ground stations, ground vehicles. These potential users, of whom the aeroplane transmitting the message has no knowledge, have the choice of processing or rejecting the messages received.

Figure 1:
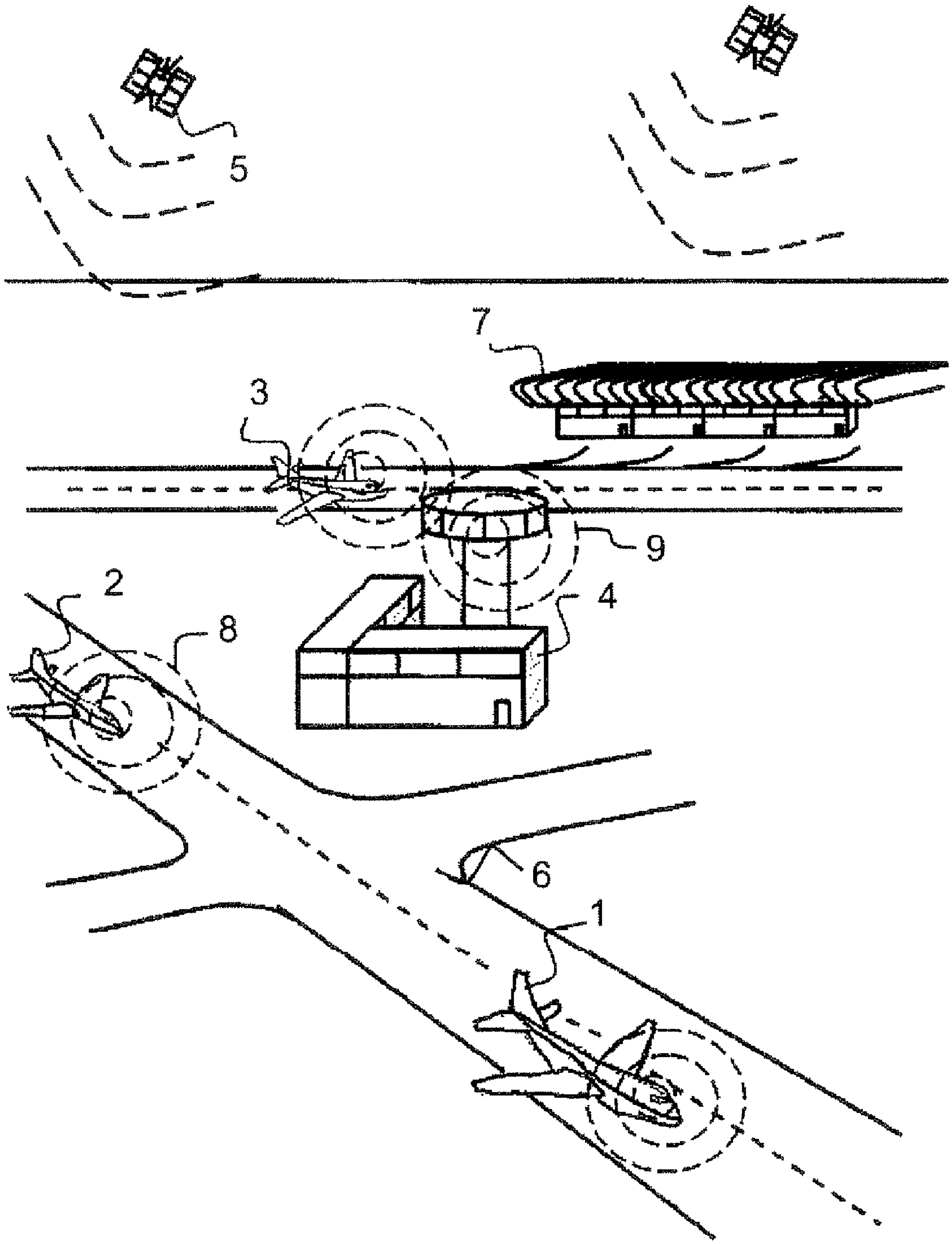
FIG. 1 represents an airport zone and the various elements cooperative with the ADS-B and TIS-B communication network.

For example, as illustrated by FIG. 1, on the surface of an airport, the machines 1, 2 and 3 comprise receive and transmit means cooperative with a communication system of ADS-B type. They transmit signals 8 automatically. These machines are capable of transmitting location information recovered from their satellite location system 13 for example. The improvement in the accuracy of satellite systems 5 makes it possible to give an accurate location of the aircraft on the taxiway 6 for example. The cooperative aeroplanes are also capable of receiving data from the communication system 9 of TIS-B type. These data originate from the control towers 4 capable of also producing data making it possible to identify aircraft that may or may not be equipped with ADS-B systems. The TIS-B system resends the radar information used by the ATC ("Air Traffic Control"), via data-link, to all the ADS-B equipped aeroplanes, which thus obtain a complete knowledge of their environment, in terms of traffic and consistent with that of the ATC.

Figure 2:
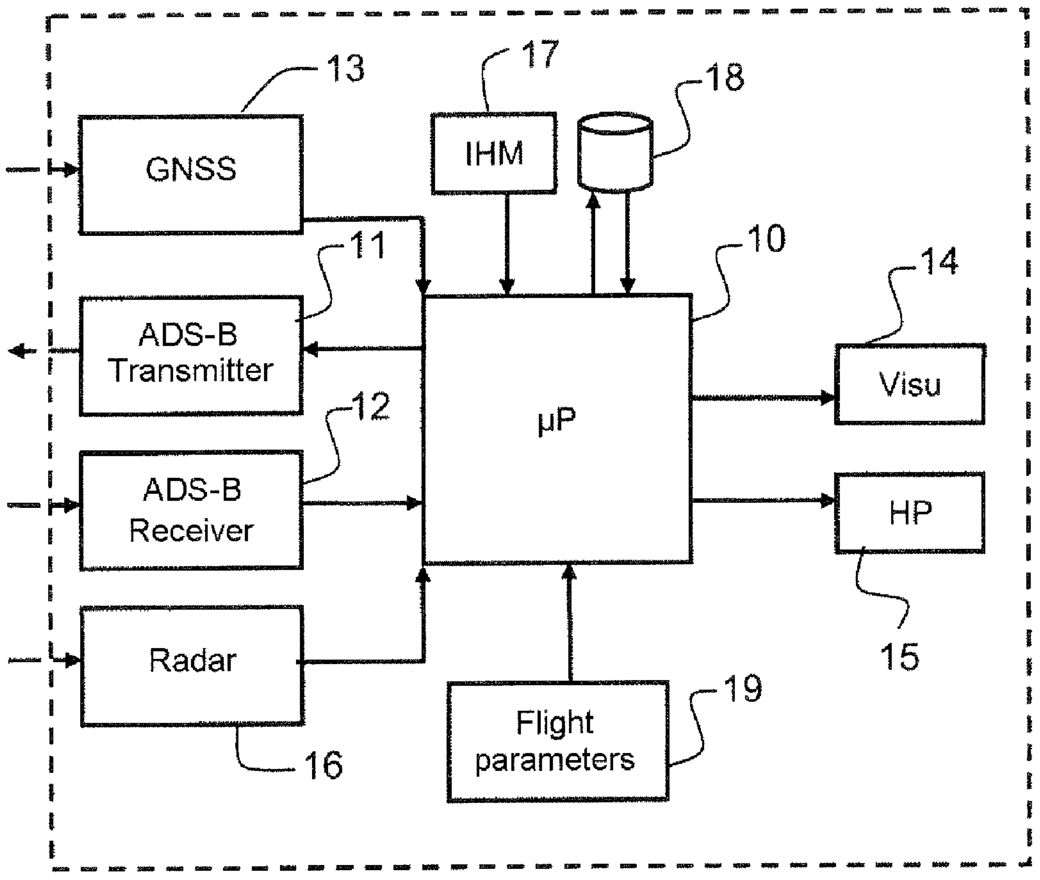
FIG. 2 represents the monitoring device according to the invention and its arrangement with the various elements carried on board the aircraft.

FIG. 2 represents a diagram of the basic systems employed for the implementation of the invention. The ADS-B systems 11 and 12 are coupled to sensors, 13, 19 and 16 for example, and make it possible to transmit information relating to their position, their speed and an indication about the quality of the data. The calculation means 10 comprise the means for processing the information originating from the various sensors in order to be broadcast. The system 13 is a satellite system receiver such as the American GPS system or the future European Galileo system. Advances in satellite systems 5 envisage providing a location accuracy of less than a metre and data integrity information. Aircraft comprising a monitoring device according to the invention are capable of obtaining a reliable, accurate and dynamic mapping of the location of aircraft on the airport space.

In one mode of implementation, the calculation means 10 can be coupled to detection devices of radar type making it possible to locate and to identify the behaviour of craft that are not cooperative with the ADS-B communication network.

Advantageously, the broadcast data comprise at least indications of location, displacement and identification of the said craft. The monitoring device has the means for recognizing craft steering towards the pilot's machine and is also capable of distinguishing those approaching at higher speed. Via the flight parameters 19 transmitted on the ADS-B network, each aircraft dynamically communicates an indication of its displacement and the monitoring device is capable of coupling these data with the flight parameters of its own machine so as to determine the most alerting surrounding aircraft. Should conflict between the aircraft and an exterior craft be detected, the monitoring device triggers audible alerts 15 and visual alerts 14, textual or graphical alerts. The crew has an interface 17 making it possible to configure the monitoring device and to select for example the modality of the alerts to be provided or the scale of the space monitored if the device has means for graphical representation on a screen.

The intrinsic and extrinsic costs of conflict of the points of the surface considered where the craft is deploying are fixed in an arbitrary manner and form conflict cost surfaces mapped by means of one and the same geographical location grid which can be:

a regular grid in terms of distance, aligned with the meridians and parallels, a regular grid in terms of distance aligned with the heading of the aircraft, a regular grid in terms of distance aligned with the course of the aircraft, a regular grid in terms of angle, aligned with the meridians and parallels, a regular grid in terms of angle aligned with the heading of the aircraft, a regular grid in terms of angle aligned with the course of the aircraft.

a (radial) polar representation centred on the aircraft and its heading, a (radial) polar representation centred on the aircraft and its course.

Typically, the grid is composed of a set of polygons with four sides, conventionally squares or rectangles, but the grid can also be described by other types of polygons such as triangles or hexagons.

In the subsequent description, use is made of a regular location grid in terms of distance, aligned with the meridians and parallels, and defined by its North-West (NWLAT and NWLON) and South-East (SELAT SELON) corners, and with angular resolution, RESLAT on the latitude axis and RESLON on the longitude axis.

In the figures, the relative proportions of the mesh cells of the location grid and the surfaces of the zones with traffic flow constraint are not complied with in order to improve readability.

Figure 3:
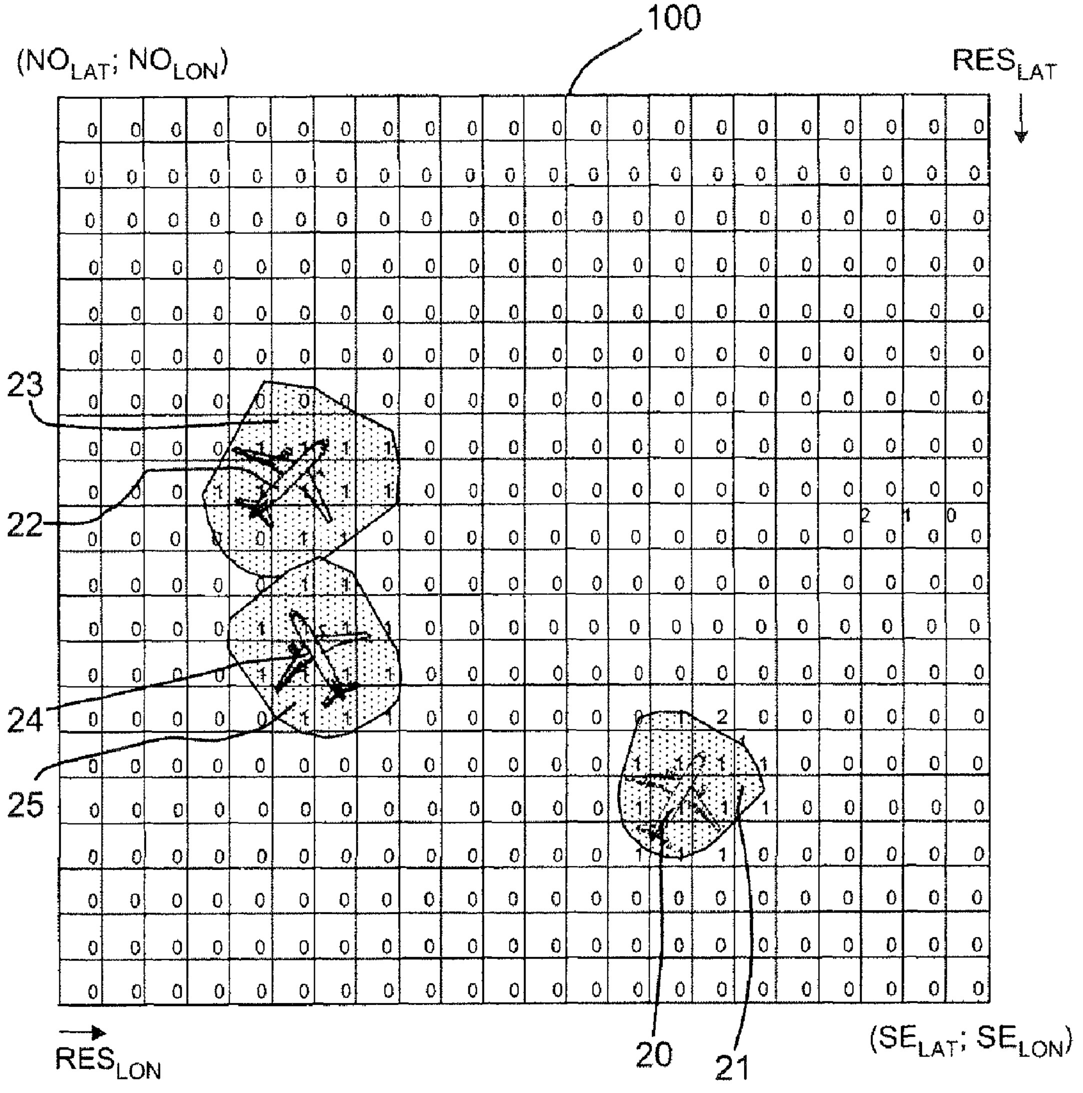
FIG. 3 represents a plot and cost of conflict of craft by means of a geographical location grid.

As represented by FIG. 3, the intrinsic cost surface conflict grid 100 extends to the whole of the surface of the airport zone in which the aircraft may be required to move. It is stored through its samples which are stored in a cost surface database 18. This cost surface database dynamically stores the information originating from the calculation means 10. These calculation means comprise the means of processing the information arising from the ADS-B receiver, this information containing data regarding aircraft identification, location on the cost surface and speed and trajectory. For each surface sample, a value, for example 1, is allocated depending on whether an aircraft is detected at the location of this sample or whether it could be situated at this location as a function of its speed and its trajectory. The calculation means 10 dynamically record the value of the samples in the cost surface database. If no craft could be situated at the location of a sample the value is set to 0 for example.

For example, the cost surface grid 100 comprises three aircraft 20, 22, 24 surrounded by a traffic flow constraint surface, the constraint surfaces 21, 23 and 25 comprise conflict cost samples set to 1 while the other samples are set to 0. The monitoring function is based on an inter-correlation function. The intrinsic conflict cost scoring and its scale are arbitrary since the principle of the invention is that the role of the inter-correlation function is to detect constraint surface conflicts with the constraint surface of the aircraft.

Figure 4:
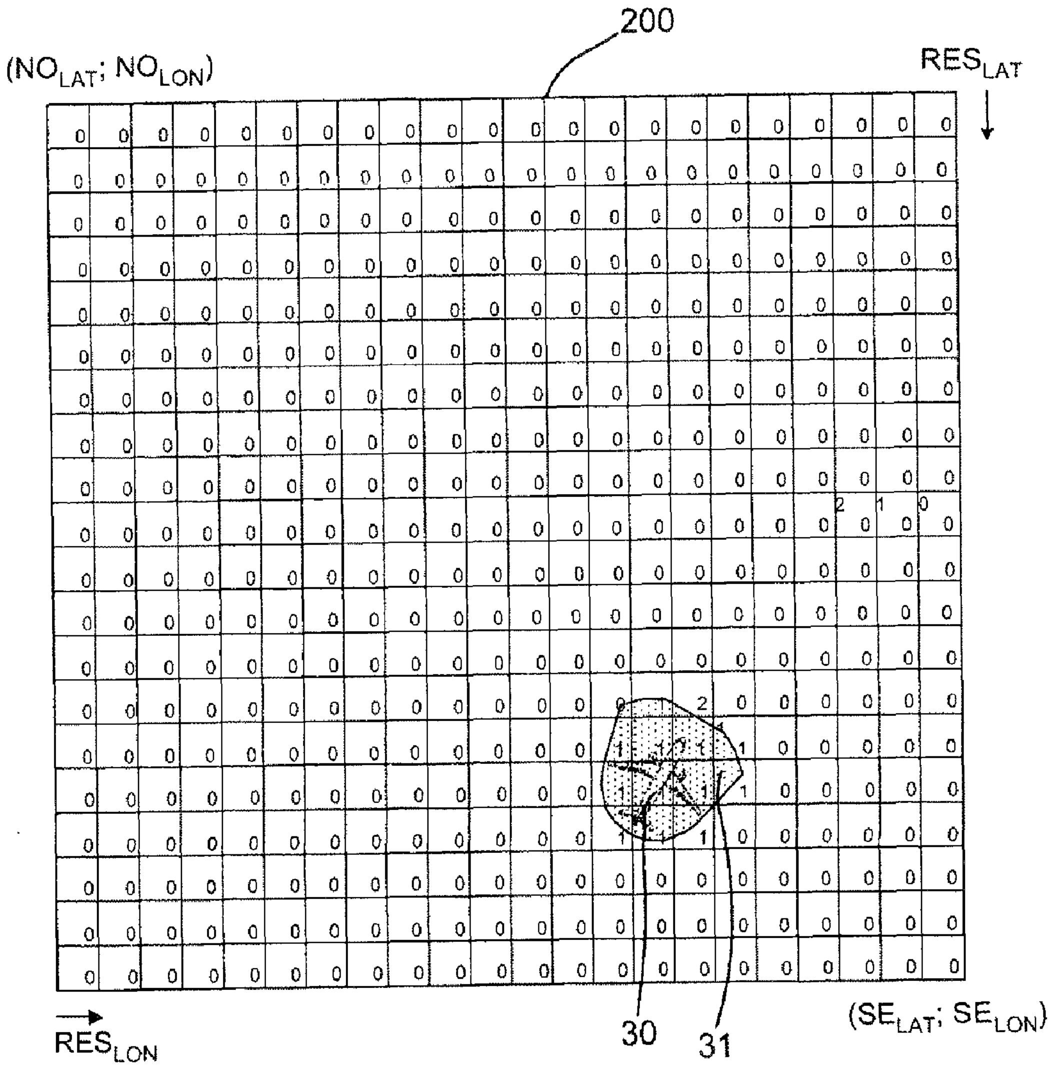
FIG. 4 represents a plot and cost of conflict of the aircraft on board which the monitoring device is carried and using the same geographical location grid used in FIG. 3.

FIG. 4 represents the extrinsic conflict cost surface grid 200. The value of a sample or rating of this extrinsic conflict cost surface is dependent on the location of the mesh cell that it occupies in the geographical location grid, with respect to the position of the craft which here is an aircraft 30.

Like the intrinsic conflict cost scoring, the extrinsic conflict cost scoring and its scale are arbitrary, the only essential being that a value which is zero or less than a predefined threshold is made to correspond to an absence of traffic flow constraint originating from the aircraft's footprint.

In the example represented, a non-zero extrinsic conflict cost score, of value 1, is allocated to the mesh cells of a surface 31 of the vicinity of the instantaneous position of the aircraft 30. A score of absence of extrinsic cost of conflict, of value zero is allocated to the samples of all the other mesh cells of the geographical location grid.

Figure 5A:
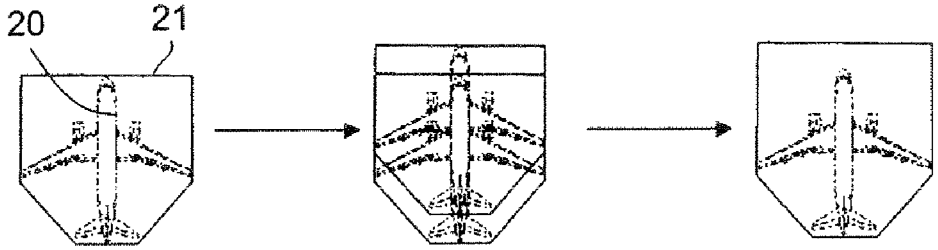
FIGS. 5*a*, 5*b* and 5*c* show a way of tracing the contour of the vicinity of an aircraft for establishing scores of extrinsic cost of conflict.
Figure 5B:
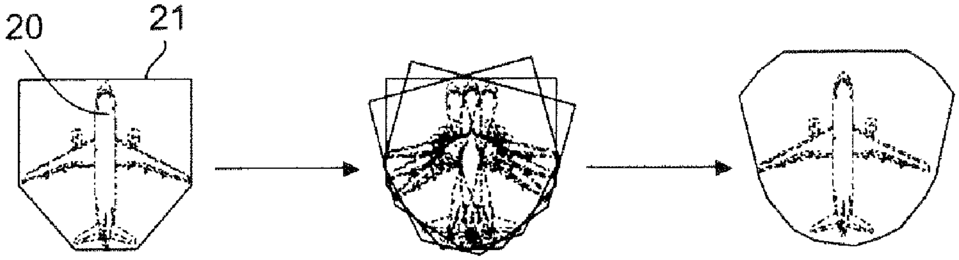
Figure 5C:
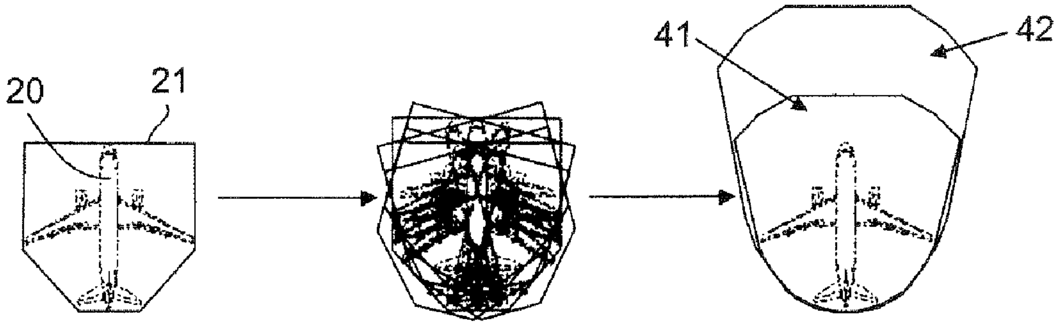

FIGS. 5*a*, 5*b* and 5*c* represent the form in which the contours of the constraint surfaces 21 related to a craft 20 are represented. The contour is established as a function of the instantaneous position of the aircraft, of its short-term foreseeable position, of its heading, represented in FIG. 5*b*, and optionally of its speed, represented in FIG. 5*a*. FIG. 5*c* represents the contours which depend on both the heading and the speed. The surface 42 of the vicinity of the aircraft 20 is the surface swept by a substantially square form 21, with two folded-down edges, circumscribing a transport aircraft whose length is substantially equal to its wingspan, displaced longitudinally, as shown by FIG. 5*a*, to take account of a position uncertainty due to the rolling speed, and angularly, as shown by FIG. 5*b*, to take account of a heading uncertainty due to the angular rate of change of heading. As shown by FIG. 5*c*, these two displacements combined lead to the surface of vicinity of the current position of the aircraft 20 being given a contour 42 exhibiting resemblances to that of a blazon or a scallop for craft of the aircraft type.

The extrinsic conflict cost surface and the intrinsic cost surface are used for an inter-correlation from which is deduced an evaluation of the risk of violation of a traffic flow constraint. More precisely, an evaluation E of risk of violation of a traffic flow constraint by a craft A with respect to zones with traffic flow constraint Z is taken equal to the value of the inter-correlation function of the intrinsic conflict cost surface related to the zones with traffic flow constraint Z and of the extrinsic conflict cost surface related to the craft A:

$$E=\int_{Grid} S_Z(x,y)\times S_A(x,y)$$

$S_Z(x,y)$ being the intrinsic conflict cost surface samples plotted in the geographical location grid 100 by an abscissa x corresponding to a latitude and by an ordinate y corresponding to a longitude, $S_A(x,y)$ being the extrinsic conflict cost surface samples plotted in the geographical location grid 200 by an abscissa x corresponding to a latitude and by an ordinate y corresponding to a longitude.

Advantageously, the method for monitoring the conflict of location of an aircraft 1 in relation to cooperative aircraft 2 and 3 implemented by the device according to claim 1, the said aircraft being provided with a geographical location system 13, characterized in that it comprises the following steps:

Modelling of a first conflict cost surface 100 encompassing the deployment surface, related to the cooperative aircraft and defined by the ratings assigned to their points, representative of their memberships in a congestion zone covering the vicinity of the current positions of each aircraft, of the uncertainties in positioning of the aircraft and of the safety margins to be complied with in relation to the aircraft, Modelling of a second conflict cost surface 200 encompassing the deployment surface, related to the aircraft and defined by the ratings assigned to its points, representative of their memberships in a congestion zone covering the vicinity of the current position of the aircraft, of the uncertainties in positioning of the aircraft and of the safety margins to be complied with in relation to the aircraft, Calculation of a score for evaluating the significance of a risk of violation of a traffic flow constraint incurred by the aircraft on the basis of an inter-correlation function of the two dangerousness cost surfaces referred to one and the same benchmark.

Thus, the value of the inter-correlation function between the two conflict cost surfaces, intrinsic and extrinsic, gives an evaluation of a risk of violation of a traffic flow constraint increasing with the depth of penetration of the craft into a zone with traffic flow constraint.

This way of evaluating a risk of violation of a traffic flow constraint by a craft deploying within zones with traffic flow constraint can be refined by a particular modelling (contour and sections) of the reliefs exhibited by the intrinsic conflict cost surface at the level of a zone with traffic flow constraint and by the extrinsic conflict cost surface in the vicinity of the craft. It can also be refined by applying a condition when considering each unit product in the inter-correlation.

Figure 6:
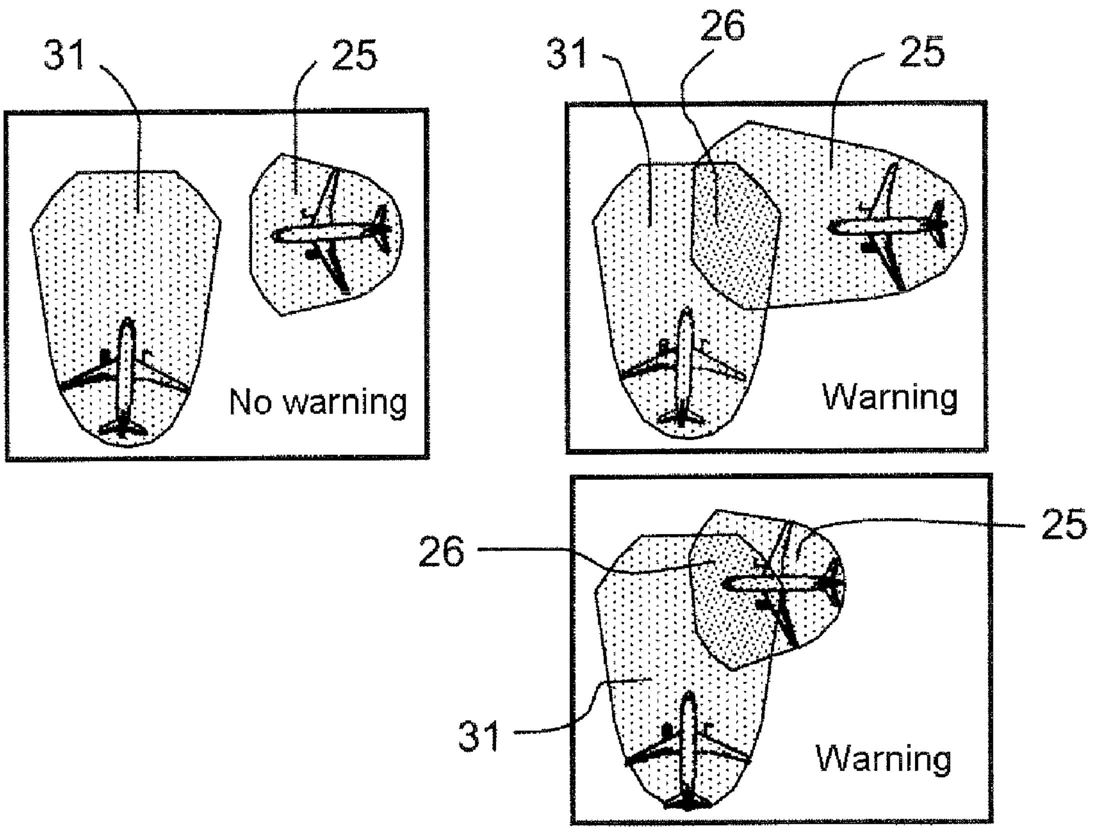
FIG. 6 represents examples of intrusion of craft and the type of risk situation that may be detected and alerted.

FIG. 6 represents three situations where the monitoring device does or does not trigger collision alerts. The first typical case, represented in the upper left box, represents the situation when the inter-correlation function does not discern any zone of conflict between the constraint surface related to the craft and that related to an exterior craft, that is to say between the extrinsic cost surface grid and the intrinsic cost surface grid. No common sample is to be found between the surface 31 and the surface 25. No alert is then raised.

Advantageously, the ratings of the points of the first and of the second conflict cost surface 25 and 31 related to cooperative aircraft also take account of the uncertainty in displacement heading of the various craft.

Advantageously, the ratings of the points of the first and of the second conflict cost surface 25 and 31 related to cooperative aircraft also take account of the speed of the various craft.

The upper right box of FIG. 6 represents an alerting situation. The extrinsic cost surface 31 is of oblong form in the direction of the heading of the first aircraft, the one on board which the monitoring device is carried. The surface takes into account the speed of displacement of the aircraft. The intrinsic cost surface 25 is also of oblong form in the direction of the heading of the second aircraft. This aircraft exhibits a sufficiently large lateral distance with respect to the trajectory of the first aircraft so as not to be located at the instantaneous moment on the displacement of the first aircraft. The two aircraft comprise a mutually perpendicular trajectory with respect to one another and these trajectories comprise an intersection point. The two aircraft move with high speed, the monitoring device therefore detects an inter-correlation zone 26 ahead of each of the two aircraft.

Consideration of the trajectory, of the uncertainty in heading and of the speed of the aircraft allows the monitoring device to alert the crew sufficiently early of a situation whose risk evaluation score is high. The crew thus has a means of anticipation for rectifying the displacement of the aircraft.

The lower right box of FIG. 6 also represents an alerting situation. The extrinsic cost surface 31 is of oblong form in the direction of displacement of a first aircraft, the one on board which the monitoring device is carried. The intrinsic cost surface 25 is also of oblong form but shorter than the surface 31. This form is shorter on account of the lesser speed of displacement of this aircraft but the score for evaluating the risk of violation of a traffic flow constraint is higher than in the previous case. Indeed, the second aircraft is located on the trajectory close to the first aircraft, the two conflict cost surfaces comprise common samples.

Figure 7:
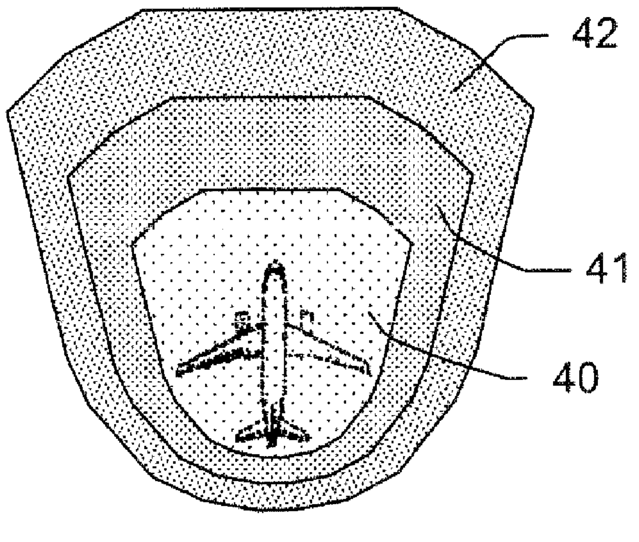
FIG. 7 shows an exemplary modelling of an extrinsic conflict cost surface in the vicinity of an aircraft.

Advantageously, the conflict cost surfaces 42 related to the aircraft are extended in a gradual manner and in the form of concentric surfaces 40 and 41, as represented by FIG. 7, forwards of the aircraft in the direction of their movement.

Advantageously, the conflict cost surfaces 43 related to the aircraft exhibit in the vicinity of the aircraft, a relief of oblong form with transverse sections of Gaussian forms 44 and 45 extending forwards of the aircraft, in the direction of their movement.

Figure 8:
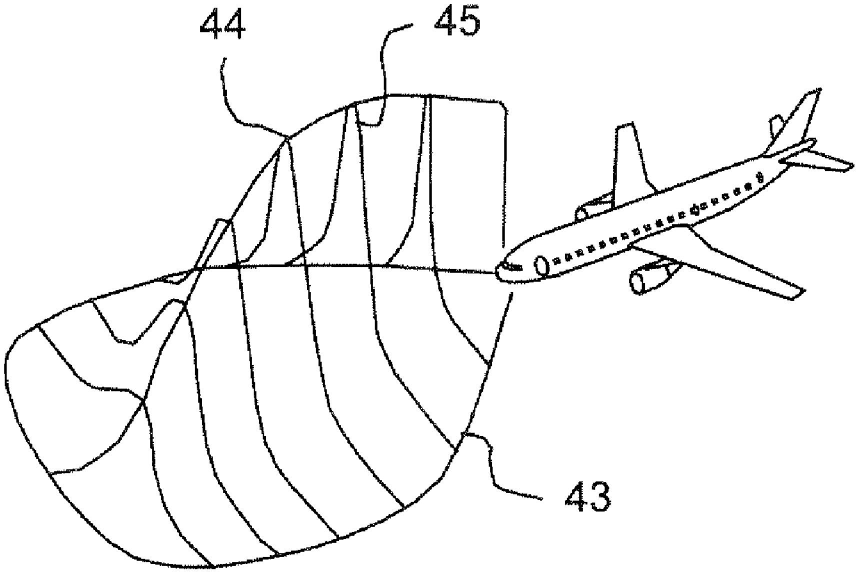
FIG. 8 shows an exemplary modelling with Gaussian volumes, of an extrinsic conflict cost surface in the vicinity of an aircraft.

The form of the relief occupying in the extrinsic conflict cost surface the surface of the vicinity of the aircraft can be that of a constant-level plateau as has been assumed in the example described previously with regard to FIGS. 3 to 6. It can also be that 43 of FIG. 8, which has Gaussian cuts 44 and 45 defined by mathematical functions involving $e^{-x^2}$ (e being the exponential function) representing the probability of presence in the short term of the aircraft at each point. Furthermore, it is noted that the surface of the vicinity of the aircraft does not necessarily include the current position of the aircraft but the most probable positions in the short term.

With such a device, the pilot of an aircraft deploying within zones with traffic flow constraint imposed by the presence of other aircraft is alerted as soon as his routing leads him to have to comply with a new traffic flow constraint. The device has a direct link with the other cooperative aircraft which transmit their location and displacement coordinates to it automatically and without specific request. The TIS-B communication network also allows it to receive in the same manner the information originating from the traffic control. The inter-aircraft cooperative ADS-B communication system transcends the problem of data updating and centralization. The alert arouses the attention of the crew and leads them to evaluate their displacement and that of the various other aircraft, thereby affording them the possibility of reacting before their manoeuvre undermines their safety and those of the other craft deploying in its surroundings. In an airport environment, the device allows an aircraft pilot to take note of an abnormal situation such as excessive proximity of his aircraft in relation to other aircraft. In the case of single-file routing to a takeoff runway for example, the crew is alerted in the case where their machine is approaching excessively close to another aircraft. Abrupt manoeuvres are also avoided thus improving passenger comfort, fuel consumption and more generally the logistics and routing of aircraft on the airport zone. The system can be coupled to other airport zone monitoring systems relating to obstacles of a different kind and also to systems receiving routing authorizations originating from local control authorities.

The invention claimed is:

1. Device for monitoring location of an aircraft in relation to cooperative craft, the said aircraft being provided with a geographical location system is cooperative with a data communication network, comprising: an onboard means for broadcasting data in an automatic manner to non-designated recipients cooperative with the communication network, an onboard means for receiving the data transmitted by transmitters cooperative with the communication network, the data comprising at least indications of location and displacement of cooperative aircraft, a cost surface database storing a first conflict cost surface encompassing the deployment surface, related to cooperative aircraft and defined by the ratings assigned to its points, representative of their memberships in a congestion zone covering the vicinity of the current positions of each cooperative aircraft, of the uncertainties in positioning of the aircraft and of the safety margins to be complied with in relation to the aircraft and a second conflict cost surface encompassing the deployment surface, related to the aircraft on board which the monitoring device is carried and defined by the ratings assigned to its points, representative of their memberships in a congestion zone covering the vicinity of the current position of the aircraft, of the uncertainties in positioning of the aircraft and of the safety margins to be complied with in relation to the aircraft, and calculation means computing a score for evaluating the significance of a risk of violation of a traffic flow constraint incurred by the aircraft on the basis of an inter-correlation function of the two dangerousness cost surfaces referred to one and the same benchmark.

2. Device according to claim 1, wherein the broadcasting means and reception means communicate with a communication network of ADS-B type.

3. Device according to claim 1, wherein the broadcasting means and reception means communicate with a communication network of TIS-B type.

4. Device according to claim 1, wherein the broadcast data comprise at least indications of location and of displacement of the craft.

5. A computer implemented method monitoring a location of a first aircraft in relation to one or more cooperative craft the aircraft and one or more cooperative craft being provided with a geographical location system, comprising the following steps:

- a. modeling a first conflict cost surface by the geographical location system:
  - i. encompassing a deployment surface, related to the one or more cooperative craft and defined by ratings assigned to their locations on the deployment surface; and
  - ii. representative of their membership in a congestion zone covering:
    1. the vicinity of the current positions of each cooperative craft;
    2. the uncertainties in positioning of the aircraft; and
    3. the safety margins to be complied with in relation to the aircraft;
- b. modeling of a second conflict cost surface by the geographical location system:
  - i. encompassing the deployment surface, related to the aircraft and defined by ratings assigned to its location on the deployment surface;
  - ii. representative of the aircraft's memberships in a congestion zone covering:
    1. the vicinity of the current position of the aircraft;
    2. the uncertainties in positioning of the aircraft; and
    3. the safety margins to be complied with in relation to the aircraft,
- c. calculating, outputting on a computer readable medium, and outputting a score for evaluating the significance of a risk of violating a traffic flow constraint incurred by the aircraft on the basis of an inter-correlation function of the first and second conflict cost surfaces.

6. Method according to claim 5, wherein the ratings of the locations on the deployment surface of the first and of the second conflict cost surface of conflict related to the cooperative craft further comprise the uncertainty in displacement heading of these craft.

7. Method according to claim 6, wherein the ratings of the locations on the deployment surface of the first and of the second conflict cost surface related to cooperative craft further comprise the speed of these craft.

8. Method according to claim 7, wherein the conflict cost surfaces related to craft are extended in a gradual manner and in the form of concentric surfaces forward of these craft in the direction of their movement.

9. Method according to claim 8, wherein the conflict cost surfaces related to craft exhibit in the vicinity of the aircraft, a relief of oblong form with transverse cuts of Gaussian forms extending forwards of these craft, in the direction of their movement.

* * * * *